United States Patent
Van Beek (10) Patent No.: US 12,428,252 B2
(45) Date of Patent: Sep. 30, 2025

(54) SHRINK CONVEYOR AND METHOD FOR ALLOWING SHRINK IN A CONTINUOUS STRIP

(71) Applicant: VMI HOLLAND B.V., Epe (NL)

(72) Inventor: Willem Marinus Van Beek, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/690,422

(22) PCT Filed: Aug. 29, 2022

(86) PCT No.: PCT/NL2022/050490
§ 371 (c)(1),
(2) Date: Mar. 8, 2024

(87) PCT Pub. No.: WO2023/038518
PCT Pub. Date: Mar. 16, 2023

(65) Prior Publication Data
US 2024/0375902 A1    Nov. 14, 2024

(30) Foreign Application Priority Data

Sep. 10, 2021  (NL) .................................... 2029170

(51) Int. Cl.
 B65H 20/02 (2006.01)
 B29C 48/00 (2019.01)
 B29C 48/355 (2019.01)
(52) U.S. Cl.
 CPC ......... B65H 20/02 (2013.01); B29C 48/0018 (2019.02); B29C 48/355 (2019.02);
(Continued)

(58) Field of Classification Search
 CPC ... B29C 48/0018; B29C 48/355; B65H 20/02; B65H 2301/44324; B65H 2301/443246;
(Continued)

(56) References Cited

U.S. PATENT DOCUMENTS

| 5,417,157 A | 5/1995 | Kobler |
| 10,081,492 B1 | 9/2018 | O'Brien et al. |

(Continued)

FOREIGN PATENT DOCUMENTS

| DE | 102009030533 A1 | 12/2010 |
| GB | 1254103 A | 11/1971 |

(Continued)

OTHER PUBLICATIONS

English translation of KR 20-0210416. (Year: 2001).*
(Continued)

Primary Examiner — Xiao S Zhao
Assistant Examiner — Joseph S Leyson
(74) Attorney, Agent, or Firm — Workman Nydegger (57) ABSTRACT

A shrink conveyor and a method are provided for allowing shrink in a continuous strip. The shrink conveyor comprises a plurality of rollers, a frame that defines a plurality of roller positions, and a first drive member for driving the plurality of rollers. Each roller of the plurality of rollers comprises a first driven part that has a first drive profile that tapers. The first drive member is arranged for rotating the plurality of rollers through contact with the first driven parts at a rotation speed in a transmission ratio to the speed of the first drive member in such a way that the first drive member contacts the first driven part of each roller of the at least three rollers at a different diameter for each roller.

28 Claims, 9 Drawing Sheets

(52) U.S. Cl.
CPC .............. *B65H 2301/44324* (2013.01); *B65H 2404/1312* (2013.01); *B65H 2404/16* (2013.01); *B65H 2801/93* (2013.01)

(58) Field of Classification Search
CPC .. B65H 2404/1312; B65H 2404/13171; B65H 2404/16; B65H 2801/93
See application file for complete search history.

(56) References Cited

U.S. PATENT DOCUMENTS

| | | |
|---|---|---|
| 10,392,192 B2 | 8/2019 | Gabor et al. |
| 11,008,169 B2 | 5/2021 | Dudek et al. |
| 2011/0089002 A1* | 4/2011 | Anderson .............. B65G 13/07 198/787 |
| 2019/0218036 A1 | 7/2019 | Gabor et al. |

FOREIGN PATENT DOCUMENTS

| | | | |
|---|---|---|---|
| JP | H09109226 | A | 4/1997 |
| JP | 2001151345 | A | 6/2001 |
| JP | 2019194124 | A | 11/2019 |
| JP | 6962953 | B2 | 11/2021 |
| KR | 20-0210416 | * | 2/2001 |

OTHER PUBLICATIONS

Japanese Decision to Grant for Japanese Patent Application No. JP2023-503478, Apr. 23, 2024.
International Search Report from corresponding PCT Application No. PCT/NL2022/050490, Nov. 23, 2022.
Dutch Search Report from corresponding NL Application No. 2029170, Jun. 29, 2022.
Japanese Office Action from corresponding JP Application No. 2023-503478, Mar. 21, 2024.

* cited by examiner

SHRINK CONVEYOR AND METHOD FOR ALLOWING SHRINK IN A CONTINUOUS STRIP

BACKGROUND

The invention relates to a shrink conveyor and a method for allowing shrink in a continuous strip, in particular a tire component for tire building.

When a tire component, in particular a continuous strip or an apex, is extruded, the tire component cools down and needs to be able to contract to allow for the elastomeric material of the tire component to relax.

Figure 10:
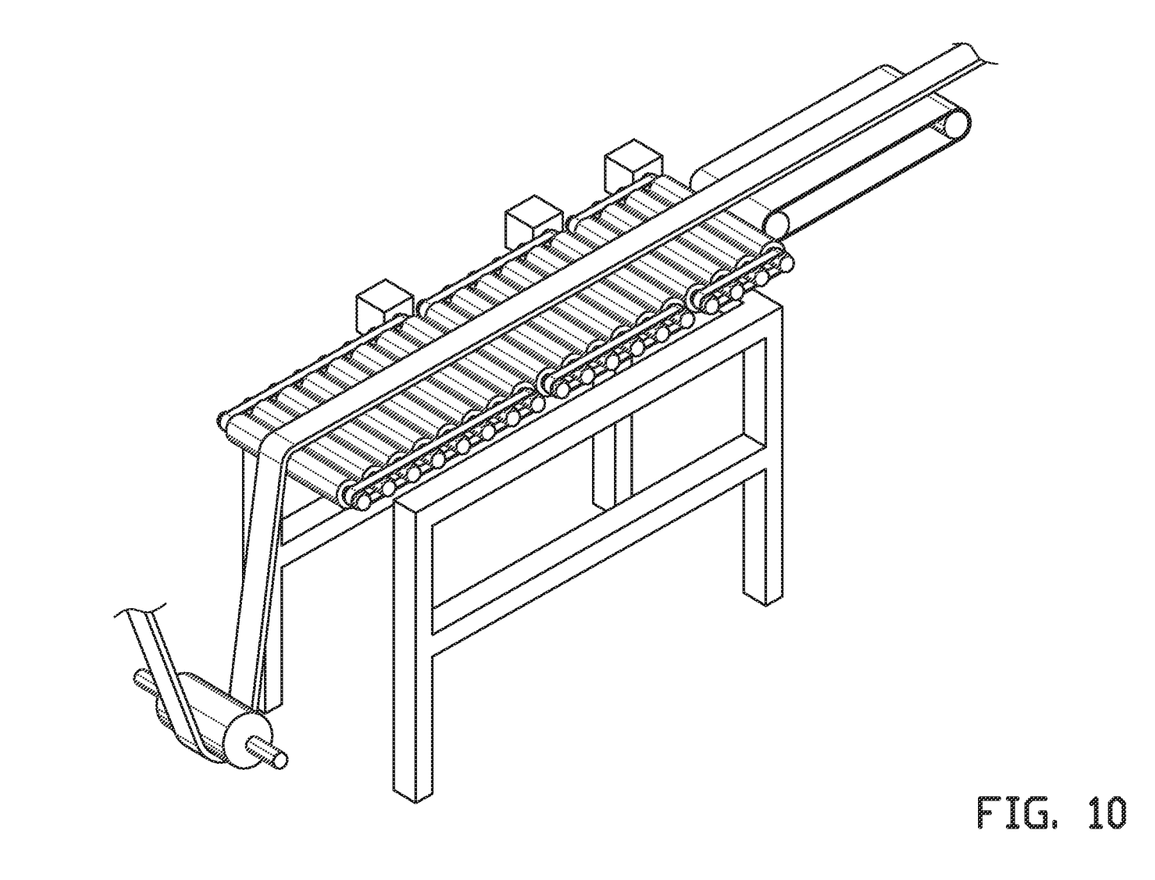
FIG. 10 shows an isometric view of a shrink conveyor according to the prior art.

FIG. 10 shows a known shrink conveyor with three shrink sections arranged consecutively in a transport direction along a transport path for a tire component. Each shrink section comprises a group of rollers and a drive belt for rotating the rollers within the group at a constant speed. For each subsequent shrink section in the transport direction, the group of rollers is driven at a speed lower than the previous shrink section to allow the tire component supported thereon to contract.

A disadvantage of the known shrink conveyor is that the speed of the rollers does not gradually decrease with each roller. Instead, the speed is reduced in three stages corresponding to the three shrink sections, with an abrupt speed difference at each transition from one stage to the next. This may result in a sub-optimal relaxation of the elastomeric material of the tire component. More in particular, there may be inconsistencies, deformations and/or residual stress in the tire component after it leaves the known shrink conveyor.

JPH 09109226 A discloses a variable conveying apparatus with a plurality of rollers which are pulled along an endless chain running along a head pulley, a tail pulley and one or more intermediate pulleys. Each roller is provided with a tapered part that contacts a rail in an upper run of the endless chain between the head pulley and the tail pulley. The rail is positioned at an oblique angle to the transport direction such that the rollers are driven through contact with said rail at an increasing faster speed as the roller is pulled in the transport direction along said rail.

SUMMARY OF THE INVENTION

Although a reversed configuration of the variable conveying apparatus according to JPH 09109226 A could be used to gradually shrink a tire component, the configuration still has considerable technical drawbacks.

Firstly, all rollers have an identical shape to ensure that they all behave in the same way as they contact and move along the rail. The oblique angle of the rail relative to the transport direction and the linear shape thereof determines the speed of the rollers at each position along the rail. Although the oblique angle of the guide relative to the transport direction can be adjusted, the linearity of the rail remains the same. Hence, there is no flexibility to adjust the speed of each roller individually, i.e. to form a non-linear decrease in speed in the transport direction or to change from a linear to a non-linear configuration.

Secondly, the speed of each roller is defined by the lateral position of the contact between tapered part of said roller and the guide, which can vary within a range defined by the conicity of the tapered part. Said range is the same for each roller. Consequently, the accuracy of the positioning of the guide relative to said range, and therefore the accuracy at which the speed of each roller can be controlled, is the same for all rollers.

Thirdly, the rollers are entered into and exit from the upper run of the endless chain along the head pulley and the return pulley, respectively, each having a relatively large diameter, larger than the rollers. This results in a relatively big gap between the conveyors upstream and/or downstream of the variable conveying apparatus.

Finally, it is common for human operators to check the shrinking process and manually adjust the position of the continuous strip on the shrink conveyor if required. The moving endless chain, the pulling of the rollers along the endless chain and the obliquely angled rail in the variable conveying apparatus according to JPH 09109226 A all present significant safety hazards, in particular in the form of potential pinch points for fingers or hands.

It is an object of the present invention to provide a shrink conveyor and a method for allowing shrink in a continuous strip, wherein the adjustability, accuracy and/or safety of the shrink conveyor can be improved.

According to a first aspect, the invention provides a shrink conveyor for allowing shrink in a continuous strip, wherein the shrink conveyor comprises a plurality of rollers, a frame that defines a plurality of roller positions fixed and spaced apart in a transport direction for holding the plurality of rollers in a mutually parallel orientation perpendicular to said transport direction and a first drive member for driving the plurality of rollers, wherein each roller of the plurality of rollers comprises a roller body that is rotatable about a roller axis extending in an axial direction and a first driven part connected to said roller body coaxially to the roller axis, wherein the first driven part in a cross section parallel to the axial direction has a first drive profile, wherein the first drive profile for at least three rollers of the plurality of rollers tapers, wherein the first drive member is arranged for rotating the plurality of rollers through contact with said first driven parts at a rotation speed in a transmission ratio to the speed of the first drive member that is defined by a diameter of the first driven part at a contact position of the first drive member along the respective first drive profiles, wherein the first drive member is movable with at least a vector component in a lateral direction parallel to the axial direction of the plurality of rollers in such a way that the first drive member contacts the first driven part of each roller of the at least three rollers at a different diameter for each roller.

By placing the rollers in fixed roller positions in the transport direction, the hazards presented by endless chains and moving the rollers relative to the obliquely positioned angled rail can be reduced and/or prevented. Moreover, because the rollers do not need to be returned around a return pulley and a head pulley, the gap between the shrink conveyor and conveyors upstream or downstream of said shrink conveyor can be reduced significantly. Meanwhile, the variable transmission ratio as described above can still provide the advantage of variable controlling the speeds of the at least three rollers.

In one embodiment the first drive profile tapers at a taper rate that is different for each roller of the at least three rollers. In other words, the first drive profiles for the at least three rollers differ in that each first drive profile tapers at a different taper angle relative to the respective roller axis. By having rollers with different first drive profiles, the speed of said rollers can be variable controlled in accordance with the differences in the respective first drive profiles, rather than the orientation of the drive means relative to said rollers. Hence, hazardous pinch points can be prevented. Moreover, because each roller can be driven, contacted or engaged in substantially the same way, the complexity of driving the rollers can be significantly reduced. Last but not least, each first drive profile can provide a relative high level of accuracy or control of the speed of the roller across the full range specific to said roller, especially when the taper rate is relatively small.

In a preferred embodiment the first driven part is at least partially conical, wherein the first driven parts of the at least three rollers have different conicities. The speed of the roller can be varied by engaging said roller at different positions along the cone-shape thereof. The conicity defines the range of the speed variation. A higher conicity means a relatively wide range, whereas a lower conicity results in a relatively narrow range.

In another embodiment the taper rate increase or decreases for each subsequent roller of the at least three rollers in the transport direction. Hence, the range in speed variation for the rollers increases or decreases from the most upstream roller towards the most downstream roller. In other words, the speed can be varied the most at the roller with the highest taper rate, whereas the speed can be varied the least at the roller with the lowest taper rate.

Preferably, the taper rate increases or decreases for each subsequent roller of the at least three rollers at least partially linearly. Hence, between each subsequent pair of rollers in the transport direction, the continuous strip can be subjected to a constant variation in rotation speed between said rollers.

In a further embodiment the taper rate increases or decreases for each subsequent roller of the at least three rollers at least partially non-linearly. The taper rate increase or decrease may be varied according to the natural shrink behavior of the continuous strip. The taper rate may for example increase or decrease more rapidly at the upstream end of the shrink conveyor and more slowly at the downstream end thereof, for example to accommodate relatively high shrinkage at the start of the shrink conveyor and reduced shrinkage downstream.

In another embodiment each first driven part has a largest circumference and a smallest circumference, wherein the largest circumference is the same for the first driven parts of all rollers of the plurality of rollers. By varying the smallest circumference only, all rollers can be driven at the same lowest speed when engaging the first driven parts at said largest circumference. The speeds of the rollers can be varied depending on the ratio between the smallest circumference and said largest circumference. Alternatively, each first driven part has a largest circumference and a smallest circumference, wherein the smallest circumference is the same for the first driven parts of all rollers of the plurality of rollers. By varying the largest circumference only, all rollers can be driven at the same highest speed when engaging the first driven parts at said smallest circumference.

In another embodiment the first drive profile for one or more rollers of the plurality of rollers downstream of the at least three rollers in the transport direction is cylindrical. The speed of the rollers having cylindrical first drive profiles remains constant or fixed.

In another embodiment the first drive profile tapers differently for each roller of at least half of the plurality of rollers. Hence, the speed of the rollers can be adjusted variably for at least half of the rollers.

In another embodiment the first drive member is configured to remain parallel or substantially parallel to the transport direction during said movement in the lateral direction. The first drive member can thus be displaced relative to each of the first driven parts over the same distance in the lateral direction, causing a change in speed of the respective rollers in accordance with the taper rate of the first drive profile of the respective first driven part.

In an alternative embodiment the first drive profile tapers at a taper rate that is the same for each roller of the plurality of rollers. The rollers can thus all be designed or configured in the same manner.

In another alternative embodiment the first drive member is configured to rotate between a neutral orientation in which the first drive member is parallel or substantially parallel to the transport direction and a skewed orientation in which the first drive member is at an oblique angle to the transport direction. The oblique angle can result in a different contact position- and thus diameter engagement and/or transmission ratio—of the first drive member on the first driven end part of each roller of the at least three rollers.

In a further embodiment the first drive member comprises an endless belt. The endless belt can exert a continuous friction onto the first driven parts to rotate the respective rollers.

In another embodiment each roller of the at least three rollers comprises a second driven part connected to the roller body coaxially to the roller axis, wherein the second driven part in a cross section parallel to the axial direction has a second drive profile, wherein the second drive profile for the at least three rollers of the plurality of rollers tapers. By providing each roller with two driven parts, the rollers can be driven more reliably and/or in a more balanced manner.

Preferably, the taper rate of the second drive profile is the same as the taper rate of the first drive profile of the same roller for each roller of the at least three rollers. Hence, the speed of the roller can be variably controlled by contacting, engaging and/or driving the roller at the two driven parts thereof in the same or substantially the same way.

In a further embodiment the second drive profile is mirror symmetrical to the first drive profile of the same roller for each roller of the at least three rollers. The two driven parts can thus be engaged or driven at contact positions that can be moved mirror symmetrically.

Alternatively, the second drive profile tapers in the same direction as the first drive profiles. The first drive member and the second drive member (described hereafter) can thus be moved in the same direction parallel to the lateral direction, thereby simplifying the means for displacing said drive members.

In a further embodiment the first driven part and the second driven part are connected to the roller body at opposite ends of said roller body in the axial direction. By providing the two driven parts at the opposite ends of the roller body, the driven parts can be easily engaged, contacted and/or driven without interfering with the conveyance of the continuous strip on the roller body.

In a further embodiment the shrink conveyor further comprises a second drive member for contacting the second driven parts of the plurality of rollers and rotating the plurality of rollers through said contact with said second driven parts. The first driven parts and the second driven parts can thus be driven by their own, dedicated drive members.

Preferably, the second drive member is movable with at least a vector component in the lateral direction. The drive members can thus be moved relative to the respective driven parts which they are supposed to contact, engage and/or drive, thereby changing the contact positions of between the drive members and the respective driven parts, and thus the speeds of the respective rollers in accordance with the drive profiles defined by said driven parts.

More preferably, the first drive member and the second drive member are configured to remain mutually parallel or substantially mutually parallel during said movement in the lateral direction. Hence, the first drive member and the second drive member can engage or contact the first driven parts and the second driven parts, respectively, in the same way.

Alternatively, the first drive member and the second drive member are configured to rotate between a neutral orientation in which the drive members are parallel or substantially parallel to the transport direction and a skewed orientation in which the drive members are at an oblique angle to the transport direction. The oblique angles can result in a different contact position- and thus diameter engagement and/or transmission ratio—of the first drive member and the second drive member on the first driven end part and the second drive end parts, respectively, of each roller of the at least three rollers.

In a further embodiment the first drive member and the second drive member are mechanically coupled to move symmetrically or substantially symmetrically in the lateral direction. Hence, the relative position of the first drive member and the second drive member with respect to the first driven parts and the second driven parts, respectively, at opposite ends of the rollers can be varied or adjusted synchronously.

In another embodiment the plurality of roller positions is greater in number than the plurality of rollers. Hence, there is some flexibility in choosing the roller positions for the rollers. Some rollers can be grouped together and regular or irregular roller patterns may be created.

In another embodiment the at least three rollers are positioned in an equal number of roller positions of the plurality of rollers positions which are evenly spaced apart in the transport direction. Hence, the continuous strip can be supported evenly along the shrink conveyor in the transport direction.

Alternatively, the at least three rollers are positioned in an equal number of roller positions of the plurality of rollers positions which are unevenly spaced apart in the transport direction. Uneven spacing between rollers may result in different speeds being imposed onto the continuous strip at different positions. Moreover, the amount of rollers per meter in the transport direction can be adjusted, to vary the amount of support for the continuous strip. In particular, the rollers may be positioned further apart to promote slack between a pair of subsequent rollers. When the continuous strip slacks, more length of the continuous strip can be accommodated within the shrink conveyor.

In another embodiment the frame is configured for interchangeably receiving each roller of the plurality of rollers in any roller position of the plurality of roller positions. The rollers can be conveniently placed into and removed from the frame. Hence, the rollers can be easily switched out or interchanged, making the shrink conveyor highly adaptable to match different shrink behaviors for different continuous strips as close as possible.

In another embodiment the first driven parts of the plurality of rollers are interchangeable. Instead of or in addition to interchanging the rollers, the first driven parts can be interchanged. Hence, rollers can be modified for different speed ranges.

According to a second aspect, the invention provides a method for allowing shrink in a continuous strip with the use of a shrink conveyor according to any one of the previously discussed embodiments, wherein the method comprises the steps of:

positioning the at least three rollers in an equal number of roller positions of the plurality of roller positions;

moving the first drive member (41) with at least a vector component in the lateral direction (L) to vary the transmission ratio for the at least three roller (3, 103, 203, 303); and rotating the at least three rollers at different rotation speeds in accordance with the varied transmission ratio between the respective rollers and the first drive member.

The method above relates to the practical implementation of the shrink conveyor according to the first aspect of the invention and thus has the same technical advantages, which will not be repeated hereafter.

In a preferred embodiment the at least three rollers are positioned in equal number of roller positions such that the taper rate increases or decreases for each subsequent roller of the at least three rollers in the transport direction.

Preferably, the taper rate increases or decreases for each subsequent roller of the at least three rollers at least partially linearly.

In a further embodiment the taper rate decreases for each subsequent roller of the at least three rollers at least partially non-linearly.

In a further embodiment the method further comprises the step of keeping the first drive member parallel or substantially parallel to the transport direction during said movement in the lateral direction.

Alternatively, the method further comprises the step of rotating the first drive member between a neutral orientation in which the first drive member is parallel or substantially parallel to the transport direction and a skewed orientation in which the first drive member is at an oblique angle to the transport direction.

In a further embodiment the at least three rollers are positioned in an equal number of roller positions of the plurality of rollers positions which are evenly spaced apart in the transport direction.

In a further embodiment the at least three rollers are positioned in an equal number of roller positions of the plurality of rollers positions which are unevenly spaced apart in the transport direction.

In a further embodiment the method further comprises the step of interchanging rollers between roller positions of the plurality of roller positions for two or more rollers of the plurality of rollers.

In a further embodiment the method further comprises the step of interchanging the first driven parts between two or more rollers of the plurality of rollers.

According to an unclaimed third aspect, the invention provides a shrink conveyor for allowing shrink in a continuous strip, wherein the shrink conveyor comprises a plurality of rollers and a frame that defines a plurality of roller positions spaced apart in a transport direction for holding the plurality of rollers in a mutually parallel orientation perpendicular to said transport direction, wherein each roller of the plurality of rollers comprises a roller body that is rotatable about a roller axis extending in an axial direction and a first driven part connected to said roller body coaxially to the roller axis, wherein the first driven part in a cross section parallel to the axial direction has a first drive profile, wherein the first drive profile for at least three rollers of the plurality of rollers tapers at a taper rate that is different for each roller of the at least three rollers.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

FIGS. 1-6 show a shrink conveyor 1 according to a first embodiment of the invention for allowing shrink in a continuous strip 9, in particular a tire component for tire building. In this exemplary embodiment, the tire component is a freshly extruded apex strip, having a substantially triangular cross section. As the apex strip leaves the extruder, it cools down and needs to be able to contract to allow for the elastomeric material to relax.

Figure 1:
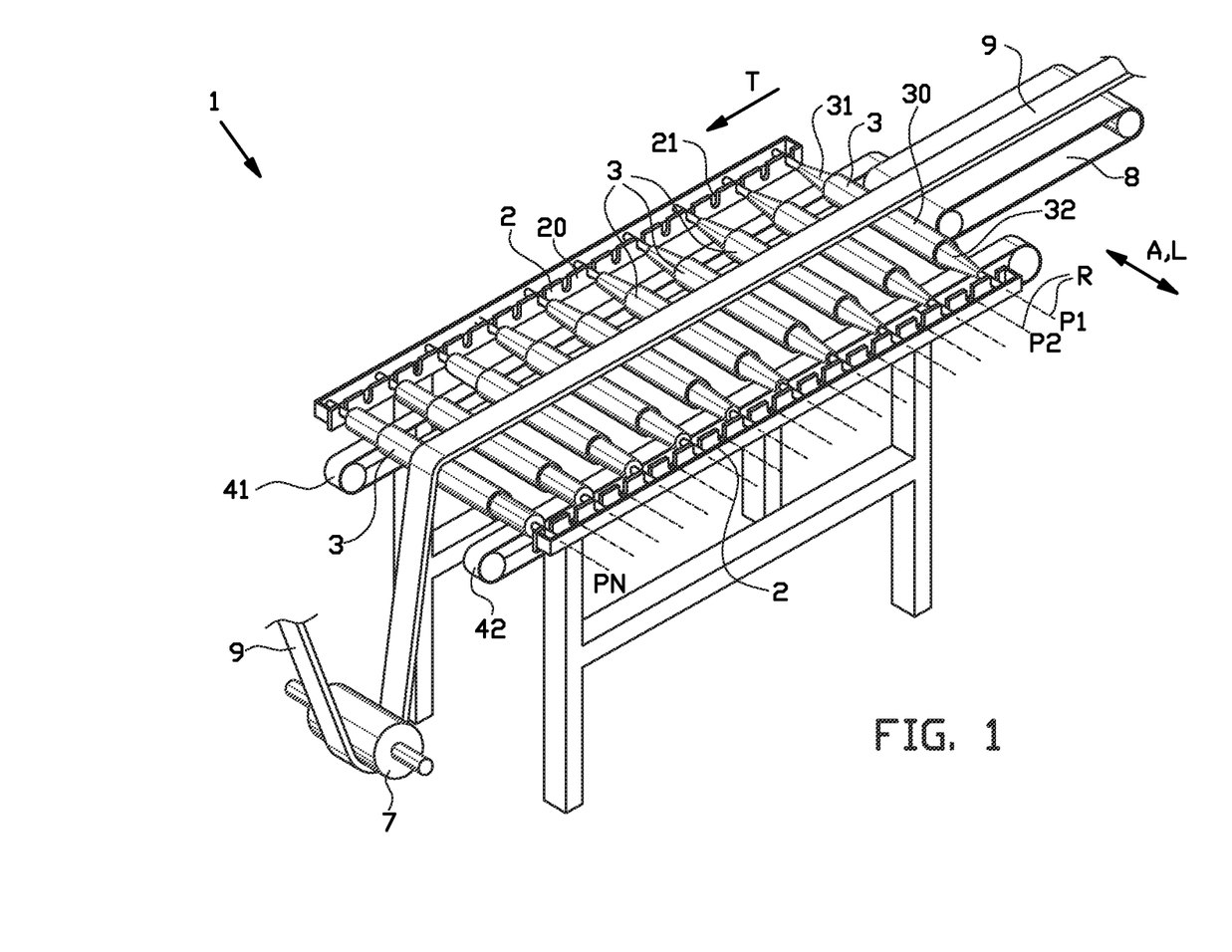
FIG. 1 shows an isometric view of a shrink conveyor with a plurality of rollers according to a first embodiment of the invention.

As shown in FIG. 1, the shrink conveyor 1 is a roller conveyor. The shrink conveyor 1 is positioned directly downstream of a pull-off conveyor 8 that pulls the continuous strip 9 from an extruder (not shown). At the downstream end of the shrink conveyor 1, a dancer roller 7 or another buffer member is provided to feed the continuous strip 9 in a loop to a subsequent station, for example a cooling drum (not shown). The shrink conveyor 1 comprises a base or a frame 2 with a frame body 20 and a plurality of frame slots 21 formed in said frame body 20 to define an array or a plurality of roller positions P1, P2, . . . , Pn. The roller positions P1, P2, . . . , Pn are spaced apart in a transport direction T. The roller positions P1, P2, . . . , Pn are fixed or stationary in the transport direction T. In other words, once placed, the rollers 3 rotate while remaining in their respective roller positions P1, P2, . . . , Pn in the transport direction T.

Figure 5:
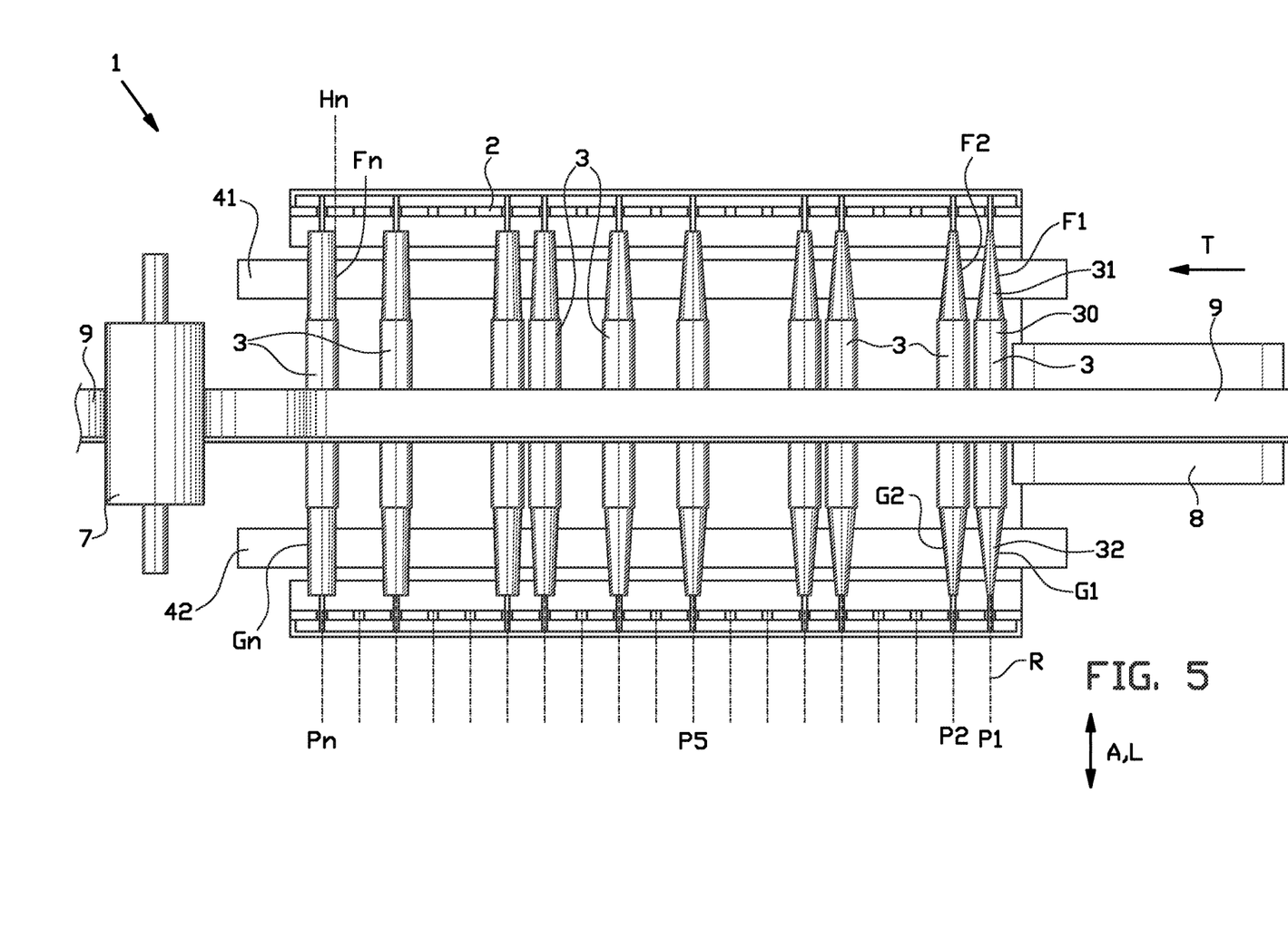
FIG. 5 shows a top view of the shrink conveyor according to FIG. 1 with a different configuration of the plurality of rollers.

In this example, the roller positions P1, P2, . . . , Pn are evenly spaced apart. The shrink conveyor 1 further comprises a plurality of rollers 3 to be received or placed in said rollers positions P1, P2, . . . , Pn. When received in the plurality of roller positions P1, P2, . . . , Pn, the rollers 3 together form or define a plane of conveyance for the continuous strip 9. Note that the shrink conveyor 1 as shown in FIG. 1 has less rollers 3 than roller positions P1, P2, . . . , Pn. In particular, the rollers 3 are positioned with one empty roller position P1, P2, . . . , Pn between. Alternatively, all roller positions P1, P2, . . . , Pn may be occupied, or a different distribution of rollers 3 over the available roller positions P1, P2, . . . , Pn may be chosen. FIG. 5 shows an alternative configuration in which some of the rollers 3 are paired in directly adjacent roller positions P1, P2, . . . , Pn while others are spaced apart by one or more empty roller positions P1, P2, . . . , Pn.

The rollers 3 are exchangeably or interchangeably received in the frame slots 21, meaning that they can be detached and/or removed from the respective roller positions P1, P2, . . . , Pn to be repositioned within the shrink conveyor 1 or to be taken out and replaced by another roller 3. In particular, the frame slots 21 are open in an upward direction such that the rollers 3 can be freely taken out in said upward direction. This may also increase operator safety because of a reduced risk of pinching. The shrink conveyor 1 may be accompanied by a set of spare rollers 3 to replace one or more of the rollers 3 currently held in the frame 2.

Figure 2:
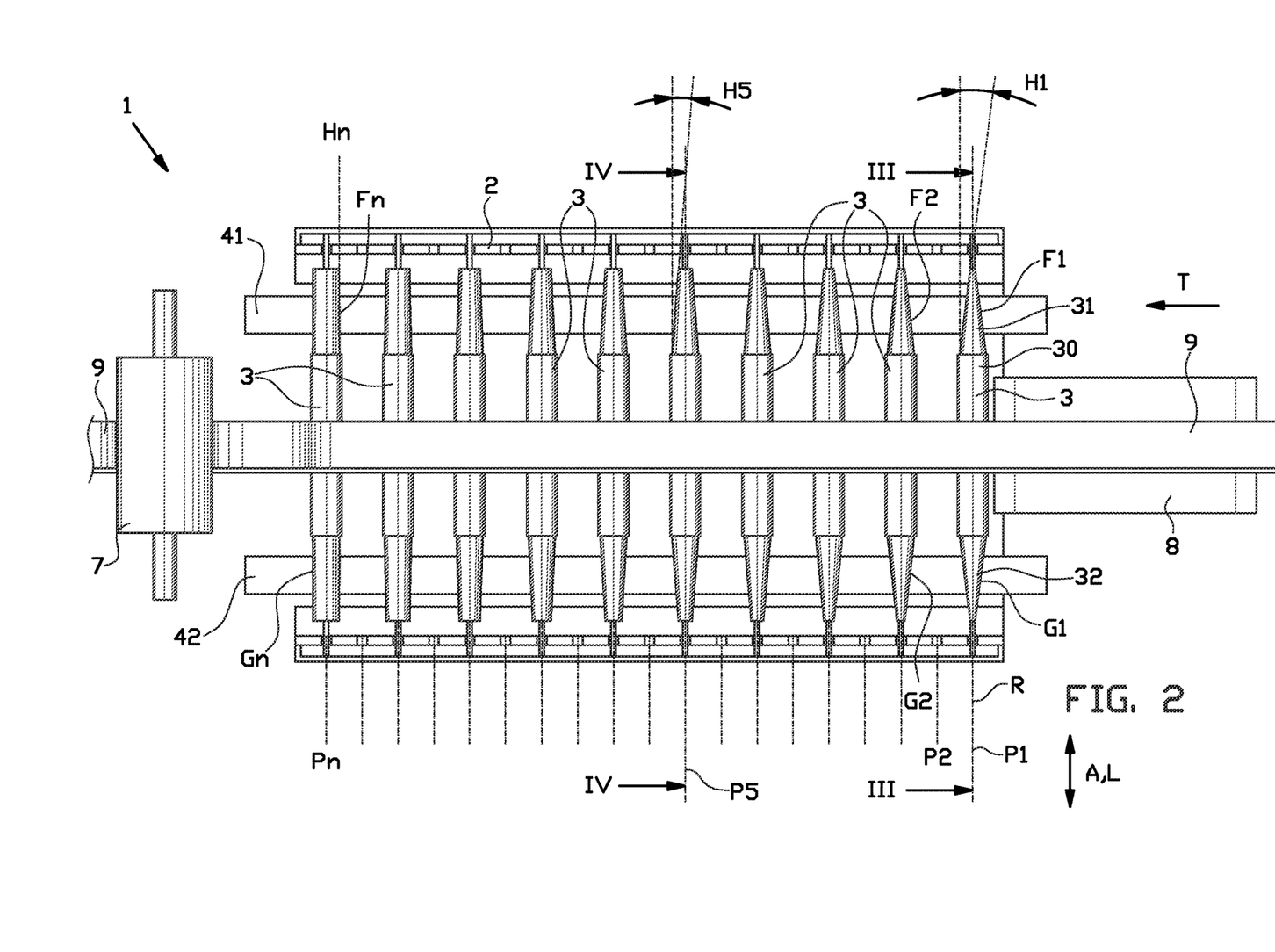
FIG. 2 shows a top view of the shrink conveyor according to FIG. 1.

As best seen in FIG. 2, each roller 3 comprises a roller body 30 that is rotatable about a roller axis R. The roller axis R defines an axial direction A. In this example, the roller body 30 is cylindrical or straight cylindrical. Alternatively, the roller body 30 may be crowned. The rollers 3, when received in the plurality of roller positions P1, P2, . . . , Pn, are mutually parallel. In other words, their roller axes R are mutually parallel. More in particular, it can be observed that the roller axes R extend in a lateral direction L parallel or substantially parallel to the axial direction A, and/or perpendicular or substantially perpendicular to the transport direction T. The frame 2 is preferably shaped or provided with an additional wall on opposite sides of the rollers 3 in the lateral direction L to enclose the rollers 3, thereby fixating them or preventing excessive movement of the rollers 3 relative to the frame 2 in said lateral direction L.

Each roller 3 is further provided with a first driven part 31 positioned or extending coaxially with respect to the roller axis R of the respective roller body 30. In this example, each roller 3 is further provided with a second driven part 32, in this case at a second end of the roller body 30 opposite to the first end. Alternatively, the driven parts 31, 32 may be arranged at intermediate positions along the roller body 30. The features described hereafter in relation to the first driven part 31 apply mutatis mutandis to the second driven part 32.

In this example, the first driven part 31 is detachably mounted to the roller body 30 at a first end thereof in the lateral direction L. Alternatively, the first driven part 31 may be integrally formed with or as a part of the roller body 30. The first driven part 31 is not necessarily positioned at the end of the roller body 30, but may alternatively be formed or positioned at an intermediate position along the length of the roller body 30 in the lateral direction L.

As shown in FIG. 2, each first driven part 31 of the plurality of rollers 3 has a first drive profile F1, F2, . . . , Fn that is different for each roller 3 of the plurality of rollers 3. Each second driven part 32 has a second drive profile G1, G2, . . . , Gn that is mirror symmetrical to the first drive profile F1, F2, . . . , Fn of the same roller 3, preferably about a mid-plane perpendicular to the axial direction A.

In particular, the first drive profile F1, F2, . . . , Fn of the plurality of rollers 3 tapers at a taper rate or a taper angle H1-Hn that is different for each roller 3. More in particular, the taper rate or the taper angle H1-Hn decreases for each subsequent roller 3 in the transport direction T. In this example, the first driven parts 31 of all rollers 3 except for the last roller 3 in the transport direction T are conical. The conical first driven parts 31 have different conicities. In particular, the conicity of the first driven parts 31 decreases with each subsequent roller 3 in the transport direction T.

The taper rate may also be expressed as a ratio between the largest diameter and the smallest diameter, or between the largest circumference and the smallest circumference, of the first driven part 31. Note that the largest diameter or the largest circumference is the same for all driven parts 31, 32. The smallest diameter or smallest circumference is progressively increased from the first roller 3 in the transport direction T towards the last roller 3 in the transport direction T.

In the example as shown, the decrease is linear, i.e. with equal decrease intervals between pairs of subsequent rollers 3. It is noted that the decrease may also be non-linear, or a combination of linear and non-linear, depending on the shrink characteristics of the continuous strip 9. If for example the continuous strip 9 tends to contract strongly in an upstream section of the shrink conveyor 1 and less strongly in a downstream section of said shrink conveyor 1, the first drive profiles F1, F2, . . . , Fn may be adjusted accordingly. The conicity, taper rate or taper angles H1, H2, . . . , Hn may be the same for the first driven parts 31 of two or more rollers 3. It is further noted that one or more rollers 3 may have a non-tapering or non-conical first drive profile F1, F2, . . . , Fn, i.e. cylindrical or straight cylindrical, such as the last roller 3 in the transport direction T. The shrink conveyor 1 may for example have two or more rollers 3 at the downstream end of the shrink conveyor 1 that have a cylindrical first driven part 31.

Figure 3:
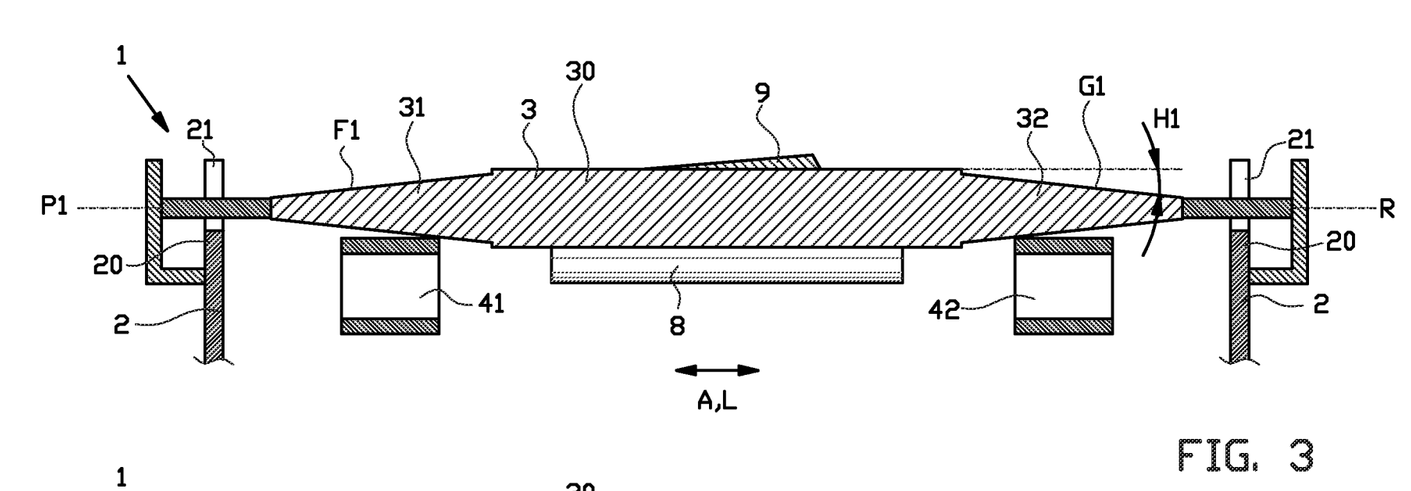
FIGS. 3 and 4 show cross sections of the shrink conveyor according to line III-III and line IV-IV, respectively, in FIG. 2.
Figure 4:
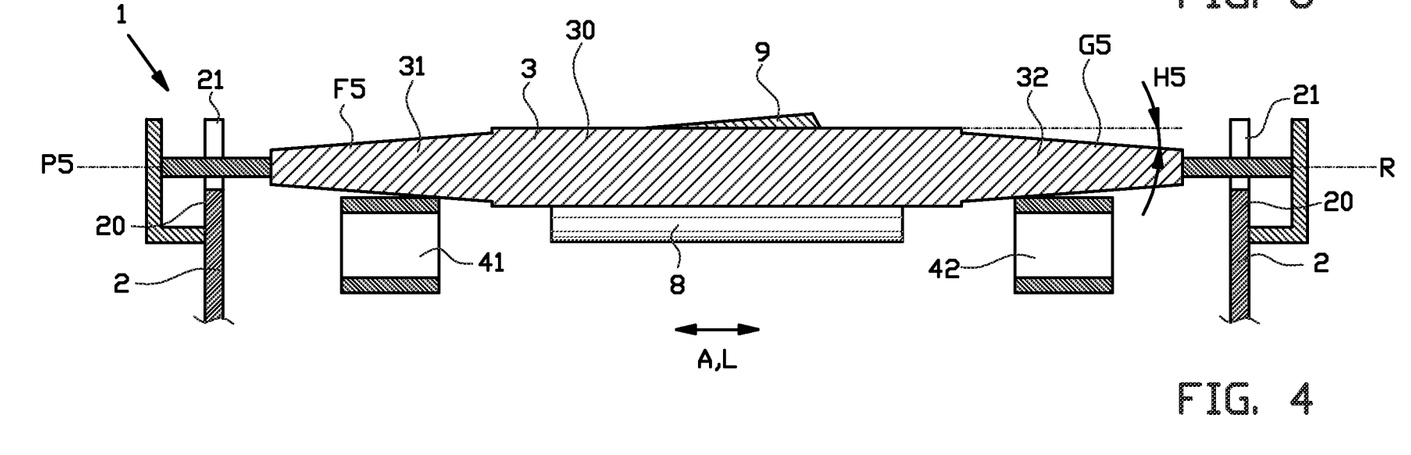

FIGS. 3 and 4 show cross sections of two rollers 3 in the first roller position P1 and the fifth roller position P5, respectively. As clearly shown, the first drive profile F1 of the first driven part 31 of the roller 3 in the first roller position P1 (FIG. 3) tapers at a first taper rate or a first taper angle H1 in excess of five degrees, whereas the fifth drive profile F5 of the first driven part 31 of the roller 3 in the fifth roller position P5 (FIG. 4) tapers at a first taper rate or a fifth taper angle H5 equal to or less than five degrees.

In the examples as shown, the taper rate or taper angle H1, H5 is constant along the respective first drive profiles F1, F5, resulting in a linear first drive profile F1, F5. It is however envisioned that in an alternative embodiment, the taper rate or taper angle H1, H5 is not constant. The first drive profile H1, H5 may for example be non-linear, convex, concave and/or crowned.

In FIGS. 3 and 4, the first driven part 31 is shown as being integral with the roller body 30. Alternatively, the first driven part 31 may be separate part that is connected or fixed to said roller body 30. The first driven part 31 may also be detachable from the roller body 30 or exchangeable or interchangeable connected to said roller body 30, i.e. to modify the first drive profile F1-Fn of the respective roller 3 without replacing the entire roller 3.

Figure 6:
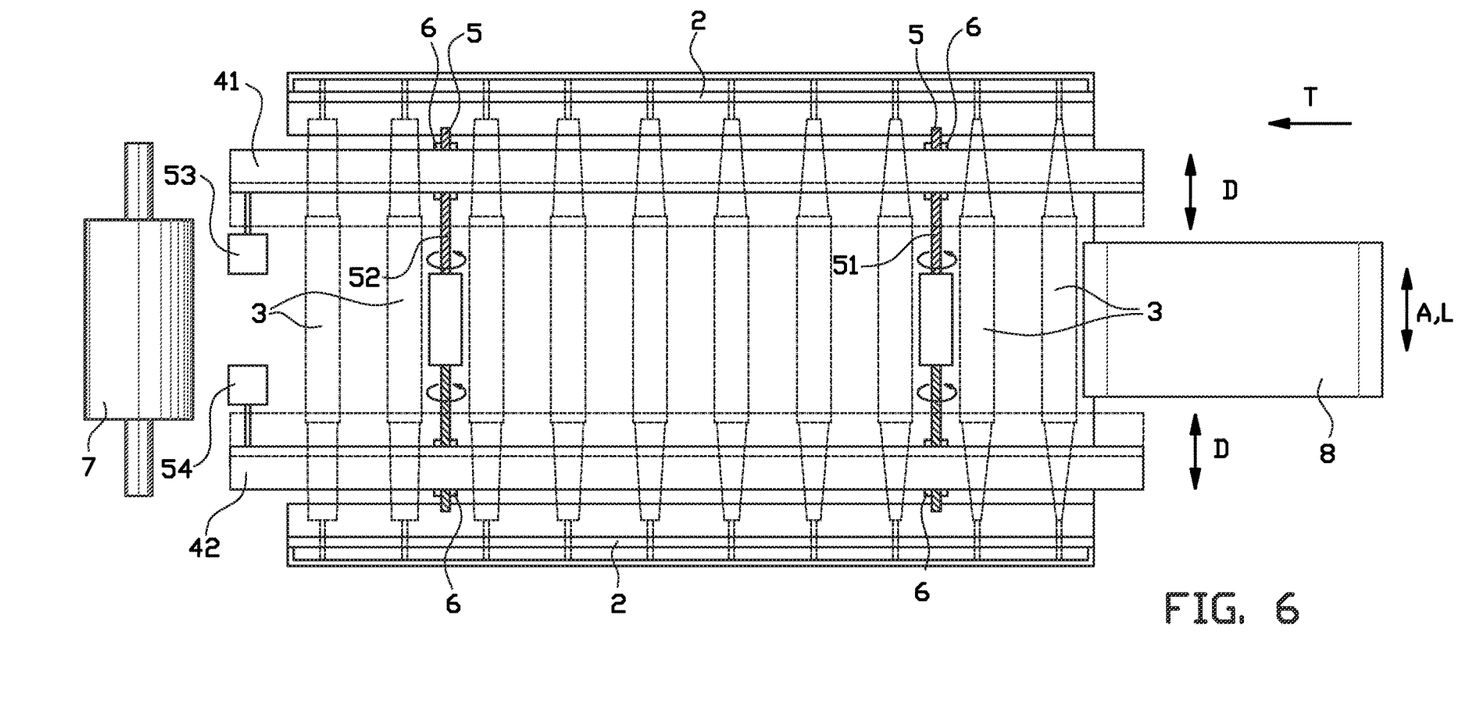
FIG. 6 shows a top view of the shrink conveyor according to FIG. 1 exposing the mechanism that drives the rollers.

As shown in FIG. 6, the shrink conveyor 1 further comprises a first drive member 41 and a second drive member 42 for contacting the first driven parts 31 and the second driven parts 32, respectively, of the plurality of rollers 3. The drive members 41, 42 extend in a direction parallel or substantially parallel to the transport direction T. The drive members 41, 42 are positioned underneath the rollers 3, i.e. along the roller positions P1, P2, . . . , Pn as defined by the frame 2. Alternatively, the drive members 41, 42 may be arranged above or around the rollers 3.

The drive members 41, 42 are configured for rotating the plurality of rollers 3 through said contact or friction with said first driven parts 31 and said second driven parts 32. In this example, the drive members 41, 42 are endless belts. The drive members 41, 42 are movable in the lateral direction L, as shown with arrows D, to adjust the contact position of said drive members 41, 42 relative to the driven parts 31, 32.

The drive members 41, 42 are mechanically coupled to move symmetrically in the lateral direction L. In particular, the shrink conveyor 1 comprises a displacement mechanism 5 for synchronously moving the drive members 41, 42 towards and away from each other in the lateral direction L. In this example, the displacement mechanism 5 comprises two spindle drives 51, 52 with oppositely threaded sections engaging with corresponding nuts 6 carrying the drive members 41, 42. The presence of two spindle drives 51, 52 ensure that drive members 41, 42 can remain mutually parallel and/or parallel to the transport direction T during their displacement in the lateral direction L.

Alternatively, the drive mechanism 5 may comprises linkages, tracks, gear racks or other suitable types of mechanical parts to displace the drive members 41, 42. In a further alternative embodiment, the drive members 41, 42 may be driven by individually controllable actuators, controlled to move synchronously, e.g. pneumatic, hydraulic or electric actuators.

Keeping the drive members 41, 42 parallel can further improve operator safety because of the reduced risk of pinching. Alternatively, the displacement mechanism 5 may be configured for introducing a slight skewing of the drive members 41, 42 towards and/or away from each other at one or both sides, to enhance the effect of the displacement on the speed of the rollers 3 towards one end of the shrink conveyor 1 in the transport direction T.

The shrink conveyor 1 further comprises one or more transport drives 53, 54, individually controllable and/or coupled to drive the drive members 41, 42 synchronously in the transport direction T.

As shown in FIGS. 3 and 4, the drive members 41, 42 are configured for contacting the rollers 3 in at least one contact position across the width of said drive members 41, 42. The rollers 3 rest on the drive members 41, 42 under the influence of gravity. In case of the conical driven parts 31, 32, the drive members 41, 42 may only contact the respective driven parts 31, 32 at the inside facing edge of said drive members 41, 42. In case of the cylindrical driven part 31, 32 at the last roller 3 in the transport direction T, the drive members 41, 42 may contact the respective driven parts 31, 32 across the entire width of said drive members 41, 42.

A method for allowing shrink in a continuous strip 9 with the use of the aforementioned shrink conveyor 1 will now be briefly elucidated with reference to FIGS. 1-6.

The method comprises the step of positioning the plurality of rollers 3 in an equal number of roller positions P1, P2, . . . , Pn of the plurality of roller positions P1, P2, . . . , Pn, in a regular pattern, as shown in FIGS. 1 and 2, or an irregular pattern, as shown in FIG. 5. The spacing between the rollers 3 may have an effect on the tendency of the continuous strip 9 to slack between subsequent rollers 3. More rollers 3 may be provided to prevent slack, or rollers 3 may be left out if slack is intended.

The method further comprises the step of driving the rollers 3 at different rotation speeds in accordance with the difference in taper rates or taper angles H1, H2, . . . , Hn between the respective drive profiles F1, F2, . . . , Fn, G1, G2, . . . , Gn. In particular, the rollers 3 are rotated at a rotation speed in a transmission ratio to the speed of the first drive member 41 that is defined by the diameter, the circumference or the circumferential length of the respective driven part 31, 32 at the contact position between the respective drive member 41, 42 and the respective driven part 31, 32 along the respective drive profile F1-Fn, G1-Gn. In the lateral positions of the drive members 41, 42 as shown in FIG. 2, the first roller 3 of the plurality of rollers 3 in the transport direction T has a relatively small circumference compared to the last roller 3 in the transport direction T, which has a constant or straight-cylindrical circumference. Hence, the speed of the first roller 3 is higher than the speed of the last roller 3 in the transport direction T. The rotation speeds of the rollers 3 between the first roller 3 and the last roller 3 will progressively decrease with each subsequent roller 3 in the transport direction T in accordance with the decreasing taper rate or taper angle H1, H2, . . . , Hn, depending on the relative position of the drive members 41, 42 with respect to the driven parts 31, 32 in the lateral direction L. The method further comprises the step of moving the first drive member 41 and the second drive member 42 in the lateral direction L to adjust the transmission ratio between the speed of the drive members 41, 42 and the rollers 3. As the drive members 41, 42 are kept mutually parallel and/or parallel to the transport direction T, all contact positions between the drive members 41, 42 and the respective driven parts 31, 32 are displaced in the lateral direction L along the respective drive profiles F1-Fn, G1-Gn with the same amount. The taper rate or taper angle H1, H2, . . . , Hn of the respective drive profiles F1-Fn, G1-Gn causes the roller 3 with the highest taper rate or taper angle H1 to change the most in speed, whereas for the roller 3 with the lower taper rate or taper angle Hn, the speed changes the least or remains constant.

The speed of the rollers 3 is determined by the relationship between the taper angle H1, H2, . . . , Hn and the speed at which the drive members 41, 42 are driven by the one or more transport drives 53, 54 in the transport direction T. The speed of the drive members 41, 42 can be adjusted to keep the speed of the first roller 31 in the transport direction T constant at all times. The taper angle H1, H2, . . . , Hn of the subsequent rollers 3 downstream of the first roller 3 then determines, in combination with the speed of the drive members 41, 42, the speed of the subsequent rollers 3 relative to said first roller 3.

For example, when the drive members 41, 42 contact the driven parts 31, 32 at a lateral position where all the driven parts 31, 32 have the same maximum diameter, the speed will be 100% across all rollers 3. However, when the drive members 41, 42 are moved laterally to a more outer position and the speed of the drive members 41, 42 is kept the same, the speed of the first roller 3 will increase the most, and the speeds of the subsequent rollers 3 in the transport direction T to an increasingly lesser extent. It is however preferred that first roller 3 is rotated at a constant speed, or at least a speed matching the speed of the pull off conveyor 8. Hence, the one or more transport drives 53, 54 can be controlled to reduce the speed of the drive members 41, 42 such that the speed of the first roller 3, despite the changed lateral position of the drive members 41, 42 relative to its drive profiles F1, G1, remains constant or substantially constant. The decreased speed of the drive members 41, 42 will cause an incremental decrease in speed across the subsequent rollers 3 in the transport direction T.

Note that the lateral position of the drive members 41, 42 relative to the rollers 3 can be controlled within a range defined by the width of the respective drive profiles F1-Fn, G1-Gn in said lateral direction L, which is the same for all driven parts 31, 32. This means that especially for rollers 3 with only a very small taper rate or taper angle, e.g. close to zero, the diameter difference between the endpoints of the respective drive profile F1-Fn, G1-Gn will be relatively small. Still, said relatively small diameter difference allows for a very accurate control of the speed or control with a very high resolution, by moving the drive members 41, 42 across the respective drive profile in the lateral direction L.

Figure 7:
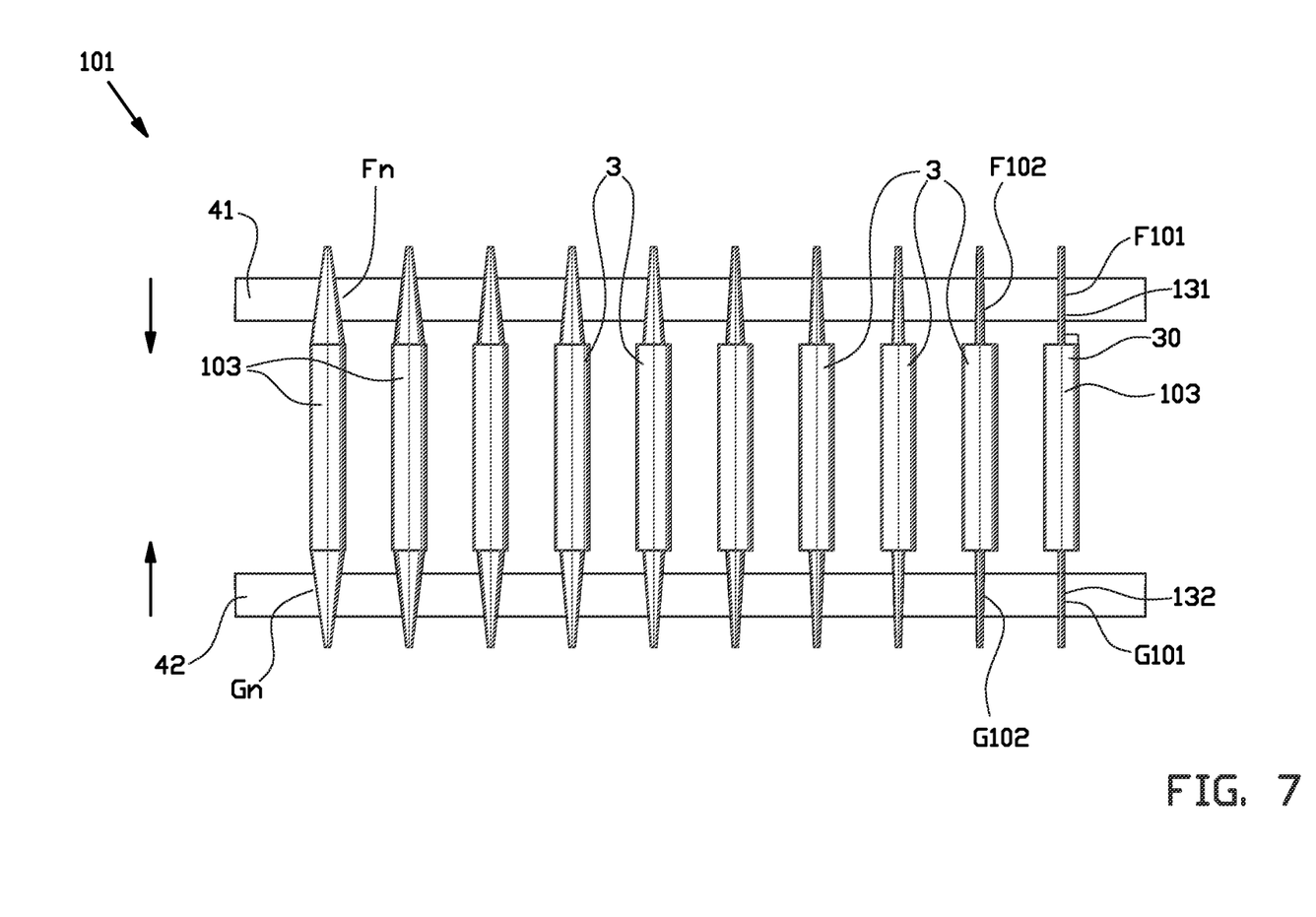
FIG. 7 shows a top view of an alternative shrink conveyor according to a second embodiment of the invention.

FIG. 7 shows an alternative shrink conveyor 101 according to a second embodiment of the invention, which differs from the aforementioned shrink conveyor 1 in that it features rollers 103 with driven parts 131, 132 that have drive profiles F101-Fn, G101, Gn that taper at a taper angle that increases which each subsequent roller 103 in the transport direction T. In particular, the drive parts 131, 132 have a minimum diameter that is the same for all drive parts 131, 132 and a maximum diameter that increases from the first roller 103 in the transport direction T towards the last roller 103 in the transport direction T. Hence, in contrast to the previously discussed embodiment, the first roller 103 is always driven at a constant ratio to the speed of the drive members 41, 42, whereas the speed of the subsequent rollers is increasingly dependent on the relationship between the speed of the drive members 41, 42 and the increasing taper angles. This can simplify the control of the drive members 41, 42, because their speeds do not have to be adjusted to keep the speed of the first roller 103 constant.

Figure 8:
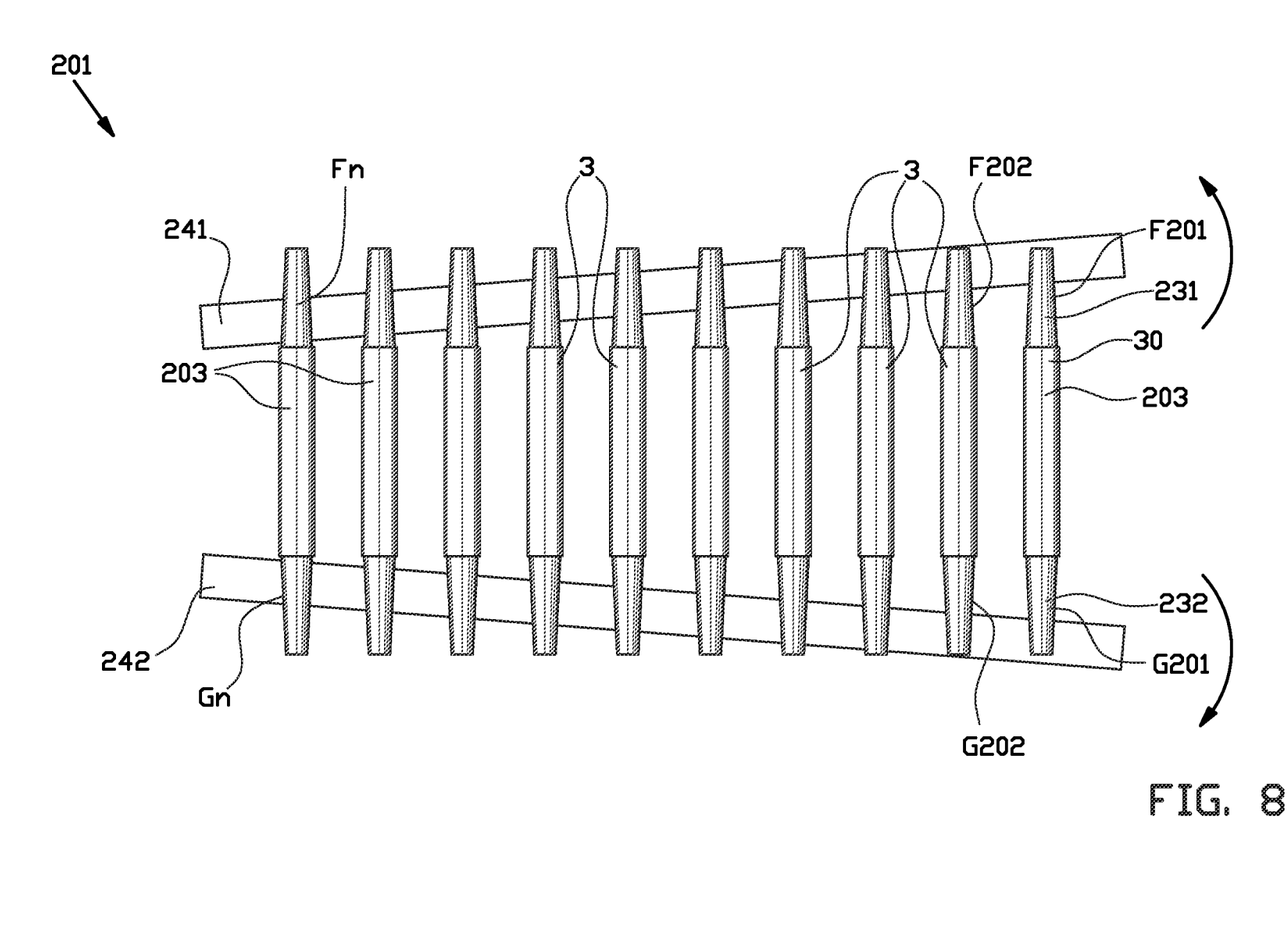
FIG. 8 shows a top view of a further alternative shrink conveyor according to a third embodiment of the invention.

FIG. 8 shows a further alternative shrink conveyor 201 according to a third embodiment of the invention, which differs from the previously discussed embodiments in that it features rollers 203 which driven parts 231, 232 that have drive profiles F201-Fn, G201-Gn that taper at a constant taper angle. In other words, the taper angle is the same for all driven parts 231, 232. The variable speed difference is generated by skewing or rotating the drive members 241, 242 from a neutral orientation in which said drive members 241, 242 are parallel or substantially parallel to the transport direction T, into a skewed orientation in which said drive members 241, 242 are at an oblique angle to the transport direction T. The skewing allows for a variable contact position between the drive members 241, 242 in the lateral direction L for the range of rollers 203. In particular, the drive members 241, 242 can be skewed such that they contact the first roller 203 at or near the minimum diameter and the last roller 203 at or near the maximum diameter of the driven parts 231, 232.

Figure 9:
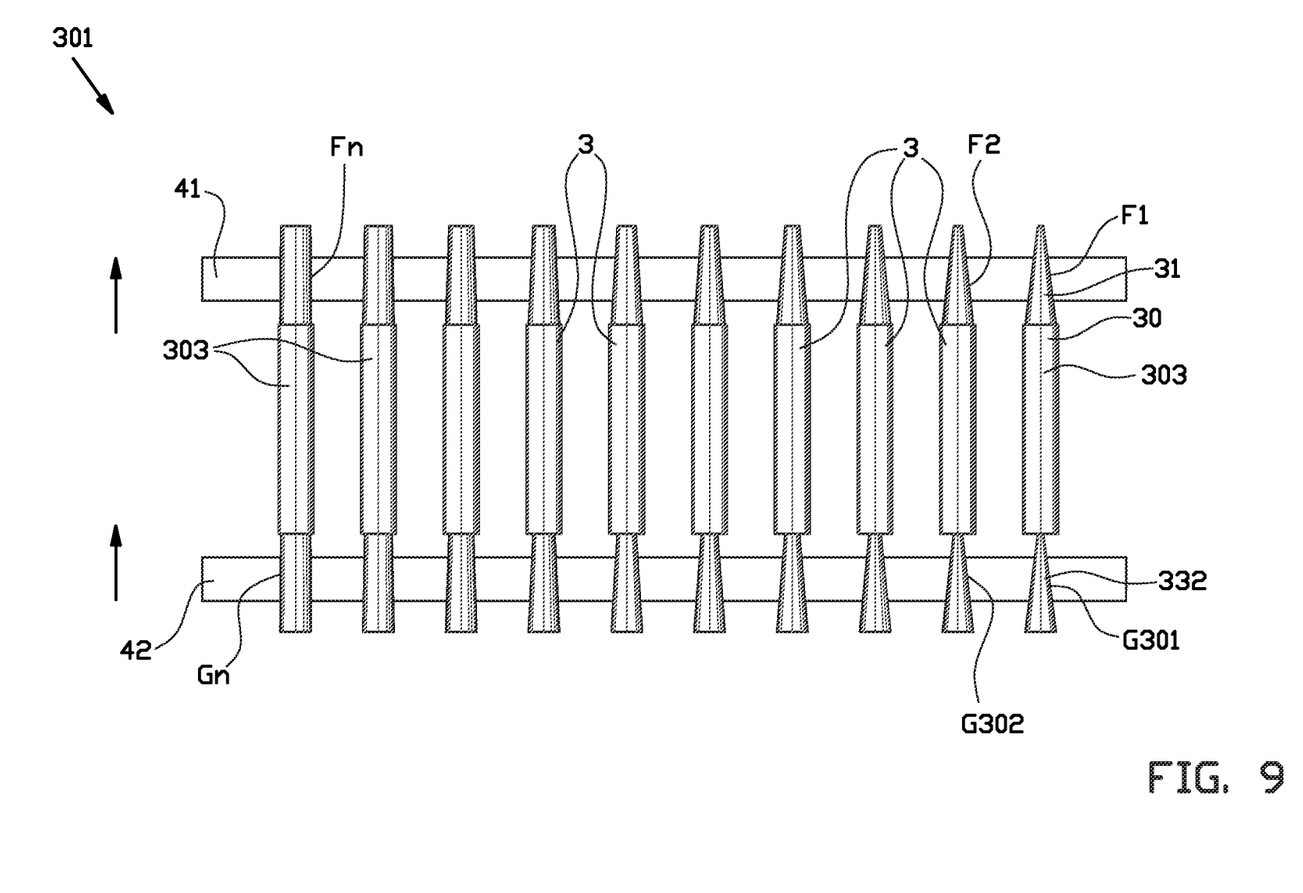
FIG. 9 shows a top view of a further alternative shrink conveyor according to a fourth embodiment of the invention.

FIG. 9 shows a further alternative shrink conveyor 301 according to a fourth embodiment of the invention, which differs from the first embodiment of the invention (FIGS. 1-6) in that it features rollers 303 that have second driven parts 332 which are not mirror-symmetrical to the first drive parts 31. Hence, the second drive profiles G301-Gn taper in the same direction as the first drive profiles F1-Fn. Consequently, the drive members 41, 42 can be moved in the same direction parallel to the lateral direction L, instead of towards and away from each other, thereby allowing for a simplification of the displacement mechanism (not shown).

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A shrink conveyor for allowing shrink in a continuous strip, the shrink conveyor comprising:
a plurality of rollers;
a frame that defines a plurality of roller positions fixed and spaced apart in a transport direction for holding the plurality of rollers in a mutually parallel orientation perpendicular to said transport direction; and a first drive member for driving the plurality of rollers, wherein each roller of the plurality of rollers comprises a roller body that is rotatable about a roller axis extending in an axial direction and a first driven part connected to said roller body coaxially to the roller axis, wherein the first driven part in a cross section parallel to the axial direction has a first drive profile, wherein the first drive profile for at least three rollers of the plurality of rollers tapers at a taper rate that is different for each roller of the at least three rollers, wherein the first drive member is arranged for rotating the plurality of rollers through contact with said first driven parts at a rotation speed in a transmission ratio to a speed of the first drive member that is defined by a diameter of the first driven part at a contact position of the first drive member along the respective first drive profiles, wherein the first drive member is movable with at least a vector component in a lateral direction parallel to the axial direction of the plurality of rollers in such a way that the first drive member contacts the first driven part of each roller of the at least three rollers at a different diameter for each roller.

2. The shrink conveyor according to claim 1, wherein the first drive profiles for the at least three rollers differ in that each first drive profile tapers at a different taper angle relative to the respective roller axis.

3. The shrink conveyor according to claim 1, wherein the first driven part is at least partially conical, wherein the first driven parts of the at least three rollers have different conicities.

4. The shrink conveyor according to claim 1, wherein the taper rate increases or decreases for each subsequent roller of the at least three rollers in the transport direction.

5. The shrink conveyor according to claim 4, wherein the taper rate increases or decreases for each subsequent roller of the at least three rollers at least partially linearly.

6. The shrink conveyor according to claim 4, wherein the taper rate increases or decreases for each subsequent roller of the at least three rollers at least partially non-linearly.

7. The shrink conveyor according to claim 1, wherein the first drive profile for one or more rollers of the plurality of rollers downstream of the at least three rollers in the transport direction is cylindrical.

8. The shrink conveyor according to claim 1, wherein the first drive profile tapers differently for each roller of at least half of the plurality of rollers.

9. The shrink conveyor according to claim 1, wherein the first drive member is configured to remain parallel to the transport direction during said movement in the lateral direction.

10. The shrink conveyor according to claim 1, wherein the first drive member comprises an endless belt.

11. The shrink conveyor according to claim 1, wherein each roller of the at least three rollers comprise a second driven part connected to the roller body coaxially to the roller axis, wherein the second driven part in a cross section parallel to the axial direction has a second drive profile, wherein the second drive profile for the at least three rollers of the plurality of rollers tapers.

12. The shrink conveyor according to claim 11, wherein the taper rate of the second drive profile is the same as the taper rate of the first drive profile of the same roller for each roller of the at least three rollers.

13. The shrink conveyor according to claim 11, wherein the second drive profile is mirror symmetrical to the first drive profile of the same roller for each roller of the at least three rollers.

14. The shrink conveyor according to claim 11, wherein the second drive profile tapers in the same direction as the first drive profiles.

15. The shrink conveyor according to claim 11, wherein the first driven part and the second driven part are connected to the roller body at opposite ends of said roller body in the axial direction.

16. The shrink conveyor according to claim 11, wherein the shrink conveyor further comprises a second drive member for contacting the second driven parts of the plurality of rollers and rotating the plurality of rollers through said contact with said second driven parts.

17. The shrink conveyor according to claim 16, wherein the second drive member is movable with at least a vector component in the lateral direction.

18. The shrink conveyor according to claim 17, wherein the first drive member and the second drive member are configured to remain mutually parallel during said movement in the lateral direction.

19. The shrink conveyor according to claim 16, wherein the first drive member and the second drive member are mechanically coupled to move symmetrically in the lateral direction.

20. The shrink conveyor according to claim 1, wherein the plurality of roller positions is greater in number than the plurality of rollers.

21. A method for allowing shrink in a continuous strip with the use of a shrink conveyor according to claim 1, wherein the method comprises the steps of:

positioning the at least three rollers in an equal number of roller positions of the plurality of roller positions;

moving the first drive member with at least a vector component in the lateral direction to vary the transmission ratio for the at least three roller; and rotating the at least three rollers at different rotation speeds in accordance with the varied transmission ratio between the respective rollers and the first drive member.

22. The method according to claim 21, wherein the at least three rollers are positioned in equal number of roller positions such that the taper rate increases or decreases for each subsequent roller of the at least three rollers in the transport direction.

23. The method according to claim 22, wherein the taper rate increases or decreases for each subsequent roller of the at least three rollers at least partially linearly.

24. The method according to claim 22, wherein the taper rate increases or decreases for each subsequent roller of the at least three rollers at least partially non-linearly.

25. The method according to claim 21, wherein the method further comprises the step of keeping the first drive member parallel to the transport direction during said movement in the lateral direction.

26. The method according to claim 21, wherein the at least three rollers are positioned in an equal number of roller positions of the plurality of rollers positions which are evenly spaced apart in the transport direction.

27. The method according to claim 21, wherein the at least three rollers are positioned in an equal number of roller positions of the plurality of rollers positions which are unevenly spaced apart in the transport direction.

28. A shrink conveyor for allowing shrink in a continuous strip, the shrink conveyor comprising:

a plurality of rollers;
a frame that defines a plurality of roller positions fixed and spaced apart in a transport direction for holding the plurality of rollers in a mutually parallel orientation perpendicular to said transport direction; and
a first drive member for driving the plurality of rollers,
wherein each roller of the plurality of rollers comprises a roller body that is rotatable about a roller axis extending in an axial direction and a first driven part connected to said roller body coaxially to the roller axis,
wherein the first driven part in a cross section parallel to the axial direction has a first drive profile,
wherein the first drive profile for at least three rollers of the plurality of rollers tapers at a taper rate,
wherein the first drive member is arranged for rotating the plurality of rollers through contact with said first driven parts at a rotation speed in a transmission ratio to a speed of the first drive member that is defined by a diameter of the first driven part at a contact position of the first drive member along the respective first drive profiles,
wherein the first drive member is movable with at least a vector component in a lateral direction parallel to the axial direction of the plurality of rollers in such a way that the first drive member contacts the first driven part of each roller of the at least three rollers at a different diameter for each roller,
wherein each roller of the at least three rollers comprise a second driven part connected to the roller body coaxially to the roller axis,
wherein the second driven part in a cross section parallel to the axial direction has a second drive profile,
wherein the second drive profile for the at least three rollers of the plurality of rollers tapers.

* * * * *